United States Patent [19]

Socha et al.

[11] 4,035,776
[45] July 12, 1977

[54] DATA DERANDOMIZER FOR RADIATION IMAGING DETECTION SYSTEMS AND METHOD OF OPERATION

[75] Inventors: Edward J. Socha, Trumbull; Paul C. Talmadge, Ansonia, both of Conn.

[73] Assignee: Picker Corporation, Cleveland, Ohio

[21] Appl. No.: 503,880

[22] Filed: Sept. 6, 1974

Related U.S. Application Data

[63] Continuation-in-part of Ser. No. 179,872, Sept. 13, 1971, abandoned.

[51] Int. Cl.² .......................................... G06F 3/05
[52] U.S. Cl. ............................ 364/900; 346/33 B
[58] Field of Search ............. 340/172.5; 346/33 B, 346/33 ME

[56] References Cited

U.S. PATENT DOCUMENTS

| | | | |
|---|---|---|---|
| 2,905,930 | 9/1959 | Golden | 340/172.5 X |
| 3,014,654 | 12/1961 | Wilser et al. | 340/172.5 X |
| 3,051,929 | 8/1962 | Smith | 340/172.5 |
| 3,094,609 | 6/1963 | Weiss | 340/172.5 |
| 3,340,515 | 9/1967 | Little | 340/172.5 |
| 3,362,014 | 1/1968 | Hauck | 340/172.5 |
| 3,374,467 | 3/1968 | Cast et al. | 340/172.5 |
| 3,406,378 | 10/1968 | Bradford | 340/172.5 |
| 3,421,147 | 1/1969 | Burton et al. | 340/172.5 |
| 3,439,342 | 4/1969 | Barton | 340/172.5 |
| 3,454,930 | 7/1969 | Schoeneman | 340/172.5 |
| 3,573,745 | 4/1971 | May, Jr. | 340/172.5 |
| 3,582,901 | 6/1971 | Cochrane et al. | 340/172.5 |
| 3,697,956 | 10/1972 | Goldman et al. | 340/172.5 |

Primary Examiner—Gareth D. Shaw
Assistant Examiner—Melvin B. Chapnick
Attorney, Agent, or Firm—Watts, Hoffmann, Fisher & Heinke Co.,

[57] ABSTRACT

A data derandomizer for use in a scintillation imaging system. The imaging system produces data signals representing radiation events and presents them to a continuously operating video tape recorder for recording and subsequent playback to an imaging apparatus. The recorder can accept the data signals only in discrete time slots. The digital signals are produced in response to radiation events occurring randomly in time and therefore also occur at random time intervals. A data stacking circuit provides for receipt and simultaneous storage of several data signals between the detector and the recorder, the storage being in priority levels according to the order of occurrence of the data signals. Inventory control circuitry controls the stacking circuit to present the data signals to the recorder synchronously with the time slots, notwithstanding the random occurrence of the data signals. The storage capacity of the stacking system reduces loss of data which would otherwise result from the occurrence of data signals at intervals spaced more closely than those of the time slots. The data stacking also enables the accumulation of several data signals which can be presented to the recorder in the regularly spaced time slots, reducing recorder down time when closely spaced data signals are followed by relatively widely spaced data signals.

21 Claims, 4 Drawing Figures

DATA DERANDOMIZER FOR RADIATION IMAGING DETECTION SYSTEMS AND METHOD OF OPERATION

CROSS REFERENCE TO CO-PENDING APPLICATION

This application is a continuation-in-part of U.S. patent application Ser. No. 179,872, filed on Sept. 13, 1971 by Edward J. Socha and Paul. C. Talmadge and assigned to Picker Corporation, now abandoned.

REFERENCES TO PATENT APPLICATIONS AND PATENTS

U.S. patent application to Ronald J. Martone et al, Ser. No. 837,072, entitled, "Scintillation Camera," and filed June 27, 1969, now abandoned, and its continuation, Ser. No. 287,623, filed Sept. 16, 1972 now U.S. Pat. No. 3,904,530.

U.S. Pat. No. 3,601,799, issued Aug. 24, 1971, to Ronald J. Martone, et al, entitled, "Digital Recording Playback Technique."

U.S. Pat. No. 3,697,753 to Ronald J. Martone et al, entitled, "Scintillation Camera System" and issued Oct. 10, 1972.

U.S. Pat. No. 3,532,927 to Robert Hindel, entitled, "Scintillation Detector Indicating System," and issued Oct. 6, 1970.

U.S. Pat. No. 3,607,956 to Samuel C. Goldman et al, entitled, "Computer System and Color Adapter for Imaging Detectors and Method of Operation" and issued Oct. 10, 1972.

U.S. Pat. No. 3,683,284 to Peter G. Mueller, entitled, "Pulse Height Analyzer" and issued Aug. 8, 1972.

U.S. Pat. No. 3,683,180 to Ronald J. Martone et al, entitled, "Scintillation Camera with Removable Subassembly" and issued Aug. 8, 1972.

BACKGROUND OF THE INVENTION

This invention pertains to radiation scintillation imaging detection systems, such as radiation scanners and scintillation cameras, and more particularly, to circuitry which may be utilized with imaging detection systems, for reducing data losses of randomly occurring data signals.

In the diagnosis of certain illnesses, radioactive isotopes are frequently administered to the patient. These isotopes have the characteristic of concentrating in certain types of tissue, and the degree of concentration in the tissue is dependent on the type of tissue. For example, Iodine 131 generally collects or concentrates in the tissue of the thyroid gland. Upon detection of the level of radioactive isotope concentration and presentation of this detected information on a suitable readout device, such as an oscillioscope, it is frequently possible to diagnose the condition of the tissue under examination.

One well-known type of device for detecting levels of radiosotope concentration is the scintillation camera. Scintillation cameras generally incorporate a relatively large disc-shaped scintillation crystal which is positioned so that the crystal scintillates upon absorbing gamma-ray energy to thereby provide pulses of light energy. A thallium activated sodium iodide crystal is typically employed to produce scintillations upon being struck by gamma radiation.

A plurality of phototubes are positioned with respect to the crystal so that a light pulse occurring in the crystal is normally detected by several of the phototubes. Each of the detecting phototubes develops an electrical signal in response to the light pulse which is of an amplitude proportional to the intensity of the light energy and the distance between the light pulse and the phototube. The signals developed by the phototubes are then amplified and applied to appropriate electronic circuitry to thereby develop electrical data signals representative of the position, as well as the intensity, of the light pulse or scintillation. One such gamma-ray imaging camera system is disclosed in the above-referenced patent application entitled, Scintillation Camera, which is incorporated herein by reference.

Prior art scintillation cameras of the type described above use a video tape recorder to record data signals representing radiation events. The signals are stored and used in subsequent imaging operations. The video tape recorder can accept data only during each of a plurality of equally spaced time intervals, or "slots."

One problem with such cameras is that information borne by the data signals is often lost when the data signals occur spaced in time at intervals shorter than those separating the time slots of the recorder. In such cases, data occurring too soon after the occurrence of a previous data signal must simply be aborted, and its informational value not used.

On the other hand, when data signals occur with less frequency than that of the recorder time slots, undesirable recorder down time occurs. When the data signals are spaced too far apart, the recorder and its downstream processing circuitry must wait for the occurrence of a new data signal before it can be processed.

SUMMARY OF THE INVENTION

According to this invention, the data signals occurring randomly in time are input to a data stacking circuit. The data stacking circuit is connected between the detector of the scintillation imaging system and the video tape recorder. The data signals are stored in storage units corresponding to various priority levels according to the order of occurrence of the data signals.

The data stacking circuitry is controlled by inventory control circuitry to present the stored data signals, one at a time, to the video tape recorder, synchronously with the occurrence of the time slots. The data signals are presented on a first-in, first-out basis, and are moved through the stacking circuitry as fast as is possible without placement of more than one data signal in any storage unit.

It is therefore an object of the present invention to provide circuitry for use with a scintillation imaging system for substantially reducing the loss of randomly occurring data signals.

Another object of the present invention is to provide circuitry for a radiation scintillation imaging detection system for converting substantially all randomly occurring data signals to representative data signals which are spaced by time intervals equal to or greater than the processing time slots of signal recording circuitry.

Another object of the present invention is to provide a derandomizer circuit for converting randomly occurring positioned data pulses to representative and uniformly spaced data signals.

A further object of the present invention is to provide circuitry for use with a radiation scintillation imaging system for storing a plurality of data signals and for, upon command, developing output data signals representative of stored data signals.

Another object of the present invention is to provide a method of operating an imaging system in order to reduce data losses.

A still further object of the present invention is to provide a method of storing data signals in order to convert randomly occurring data signals to data signals which occur at a preselected rate.

The present invention is directed toward a derandomizing circuit for radiation scintillation imaging system, and the method of operation thereof, thereby overcoming the noted disadvantages, and others, of such previous systesm.

An apparatus embodying the present invention as described above includes a derandomizer data stacking circuit for an imaging apparatus of a scintillation camera. The data stacking circuit receives the randomly occurring data signals. Each data signal bears information representative of the position of a radiation stimulus event. The apparatus also includes inventory control circuitry for actuating the data stacking circuitry to present the data signals to a recorder of the imaging detection system one at a time synchronously with occurrence of the recorder time slots.

The derandomizer data stacking circuit includes at least first and second data storage units, each corresponding to a priority level of the data signal in that unit, according to the order of occurrence of the data signal. The first storage unit is connected to receive the randomly occurring data signals, and includes means for applying its stored signals to an output in response to a command clocking signal.

The second data storage unit is coupled to the output of the first storage circuit for receiving and storing signals from the first storage unit output. The second storage unit also applies its stored signals to a second output in response to the occurrence of a command clocking signal directed to the second storage circuit. The second output is ultimately connected to the recorder.

The inventory control circuitry monitors the location of data in each of the first and second storage units and advances the data in the data stacking circuitry toward the video tape recorder, as quickly as space for such data becomes available. As soon as data is advanced out of the second data storage circuit, data stored in the first storage circuit is advanced to the second storage unit. When the inventory control circuitry detects the absence of data in the first storage unit, it enables any subsequent randomly occurring data signal to enter the first storage unit.

The inventory control circuitry also governs the rate of presentation of the data signals from the stacking circuitry to the video tape recorder. The stacking circuitry is thereby controlled to present the data signals at regular intervals in synchronism with the recorder time slots.

According to another aspect of the present invention, the derandomizer circuit includes counter circuits for digitizing pattens of data signals, and the data storage circuits comprise buffer registers for storing patterns of signals representative of the data signals.

According to another aspect of the present invention, the output signals which are transferred out of the second data storage unit are applied to a digital-to-analog converter circuit. The output signals developed by this converter circuit are applied to a readout device, such as an oscilloscope, for providing an output presentation of the output data signals.

According to another aspect of the present invention, the inventory logic circuitry includes a logic circuit for applying command signals to the second data storage unit in order to transfer out of this storage unit data signals at a uniform rate.

According to still another aspect of the present invention, the logic control circuitry applies command signals to the data storage units to cause the stored data signals to be transferred to a succeeding storage unit immediately upon the transfer of data signals out of the succeeding storage unit. Thus, data signals are automatically transferred as far forward as possible through the plurality of data storage units so that the data signals may be transferred out of the final highest priority storage unit at preselected time intervals.

According to another aspect of the present invention, there is provided a method of converting randomly occurring data signals to a train of substantially uniformly spaced data signals each being representative of the value of one of the randomly occurring data signals. The method includes the steps of electrically storing first data signals in a first data storage unit, and automatically transferring the data signals to a second data storage unit immediately after the completion of storage of the first data signals in the first data storage unit. The method also includes the step of applying a command signal to the second data storage unit at a preselected time to transfer output data signals out of the second data storage at the preselected time.

According to still another aspect of the present invention, the method includes the step of converting the output data signals from digital form to analog form, and applying the analog form data signals to a readout device, such as an oscilloscope for providing an output presentation of the data signals.

It is therefore an object of the present invention to provide circuitry for an imaging detection system for reducing losses of data signals which normally occur in the processing of randomly occurring data signals.

Another object of the present invention is to provide a storage arrangement and inventory control circuitry for controlling the operation of the storage arrangement for converting randomly occurring data signals to corresponding data signals which occur at preselected time intervals.

Another object of the present invention is to provide circuitry for a radiation imaging detection system for converting randomly occurring data signals to data signals which occur at a rate consistent with the capabilities of the data processing circuitry for the imaging system.

Another object of the present invention is to provide a method of controlling the storage of data signals in order to convert randomly occurring data signals to data signals which occur at uniform rates.

Another object of the present invention is to provide a method of operating a radiation imaging detection system by controlling the transfer of stored data signals between a plurality of storage units in order to convert randomly occurring data signals to corresponding data signals which occur at preselected time intervals.

These and other objects and advantages of the invention will become apparent from the following description of a preferred embodiment of the invention, as read in conjunction with the accompanying drawings in which:

DESCRIPTION OF THE PREFERRED EMBODIMENT

Figure 1:
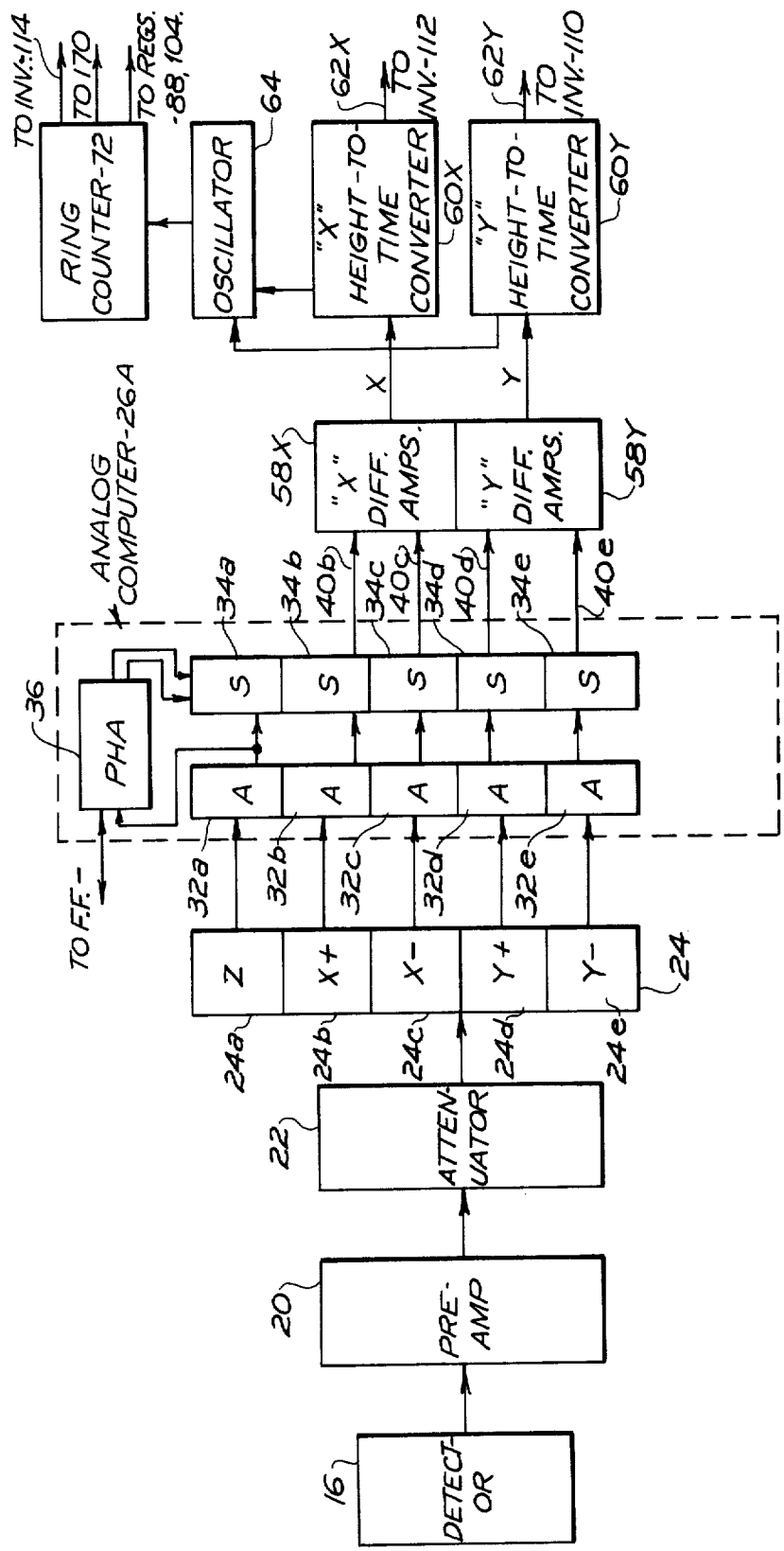
FIG. 1 is an electrical block diagram illustrating in basic form the input and analog computing circuitry of a radiation imaging detection system; and, FIGS. 2 and 3 are electrical block and schematic diagrams illustrating the derandomizer circuit of the present invention.

Referring now to the drawings, and in particular, to FIG. 1, the present invention is shown in conjunction with a radiation scintillation imaging system. The imaging system generally includes a radiation detector unit 16 having its output coupled to a preamplifier circuit 20. The detector unit 16 is shown and described in detail in the above-referenced patent application to Ronald J. Martone entitled Scintillation Camera with Removable Subassembly. The detector unit 16 includes a plurality of phototubes. Certain ones of the phototubes are utilized to determine the location of a scintillation in terms of X+, X−, Y+ and Y− coordinates. Also, the output signals from all of the phototubes are summed to provide a Z signal.

The signals from the phototubes in the detector unit 16 are amplified by preamplifiers contained in the preamplifier circuit 20, and are then attenuated to various degrees in an attenuator circuit 22.

From the attenuator circuit 22, the signals are supplied to a decoding assembly 24 comprising five matrices labeled 24a–24e. The output signals of the decoding matrices 24a, b, c, d, e, are supplied as input signals to an analog computer 26A.

The input signals to the analog computer 26A from the decoding matrices 24a–e are respectively provided to five variable gain amplifiers 32a–e. The amplifiers 32 are fully illustrated and described in the above-referenced patent application to Ronald J. Martone, entitled Digital Recording Playback Technique.

The output signals from the amplifiers 32a–e are respectively provided to pulse stretchers 34a–e, and the output from the amplifier 32a is also supplied as an input to a pulse height analyzer 36. The pulse height analyzer 36 is shown and described in detail in the above-referenced Patent to Peter G. Mueller, entitled Pulse Height Analyzer, and the pulse stretchers 34 are similarly described in the above-referenced Patent to Robert Hindel entitled, Scintillation Detector Indicating System. Reference is made to the above Patents for a complete description of the components 34, 36 comprising the analog computer 26A. Reference is also made to the above-referenced patent application to Ronald J. Martone et al, entitled, Scintillation Camera for a complete description of a radiation imaging system. The lead 40b accurately represents the X+ position of a scintillation event occurring in a scintillator, the lead 40c carries a signal which accurately represents the X− coordinate of such an event, the lead 40d carries a similar signal which represents the Y+ coordinate of the event, and the lead 40e carries a similar signal which represents the Y− coordinate of the event.

A timing circuit (not shown) develops a signal indicating the end of a cycle and then applies a reset signal to the pulse height analyzer 36.

The four output signals from the stretchers 34b–e are provided to two differential amplifiers 58X, 58Y. The X+ and X− signals on the leads 40b, 40c are provided to the amplifier 58X, and the Y+ and Y− signals on the leads 40d, 40e are provided to the amplifier 58Y. Each of these amplifiers 58X, 58Y combines its respective input signals and provides a single output signal respectively representing X and Y location coordinates. The X coordinate signal from the output of the amplifier 58X is provided to a height-to-time converter 60X, and the Y coordinate signal is provided from the Y differential amplifier 58Y to a height-to-time converter 60Y.

The height-to-time converters 60X, 60Y are conventional components that produce gating pulses of constant predetermined amplitudes, whose lengths are proportional to the amplitudes of the input signals to the converters. The output signals of the converter 60X, whose time durations are proportional to the amplitudes of the input signals from the differential amplifier 58X, are provided to an output lead 62X. Similarly, the output of the converter 60Y is provided to an output lead 62Y. An oscillator 62 is actuated by the signals from either or both of the converters 60X, 60Y and, in turn, provides a train of pulses in which the number of pulses is controlled by the longest output pulse from either of the converters 60X, 60Y. Thus, a succession of output pulses is provided from the oscillator 64 that is proportional in length to the height of the highest output pulse of the differential amplifier 58X. Pulses are provided from the leads 62X, 62Y that are proportional in length to the height of the output pulses from the differential amplifiers 58X, 58Y respectively.

The construction and function of the converters 60X, 60Y, and the oscillator 64 are comparable to those described in an article by D. H. Wilkinson entitled, "A Stable Ninety-Nine Channel Pulse Amplitude Analyzer for Slow Counting," *Proceedings Cambridge Philosophical Society*, Volume 46, Part III, pgs. 508–518 (1950).

The output terminal of the oscillator 64 is coupled to a ring counter 72. The ring counter 72 is shown and described in detail in the above-described patent application to Ronald J. Martone et al, entitled, Digital Recording Playback Technique. As set forth in this latter mentioned patent application, the ring counter has 24 different intervals. These various intervals provide timing signals which control various operations of the derandomizer circuit.

Figure 2:
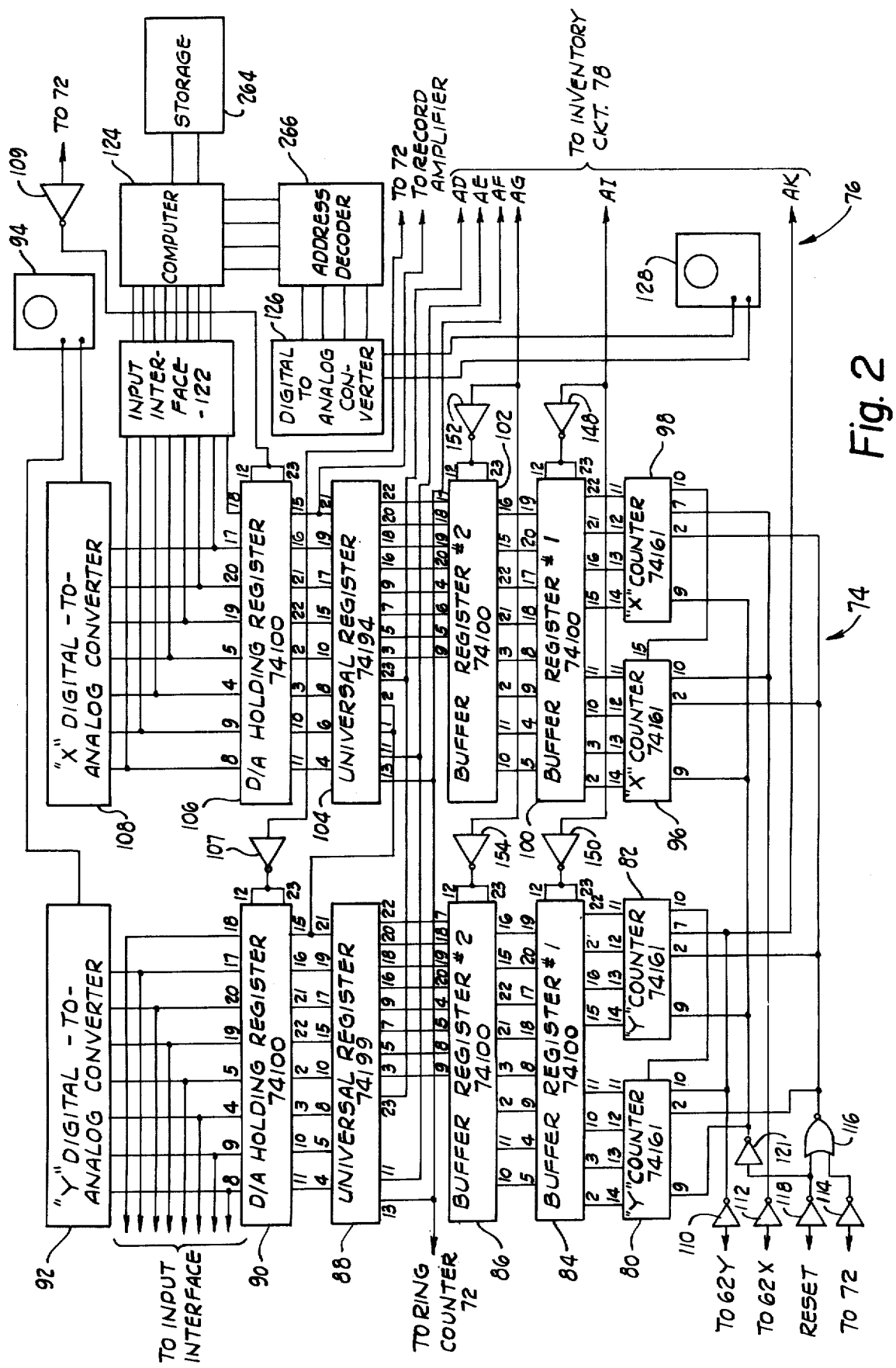
Figure 3:
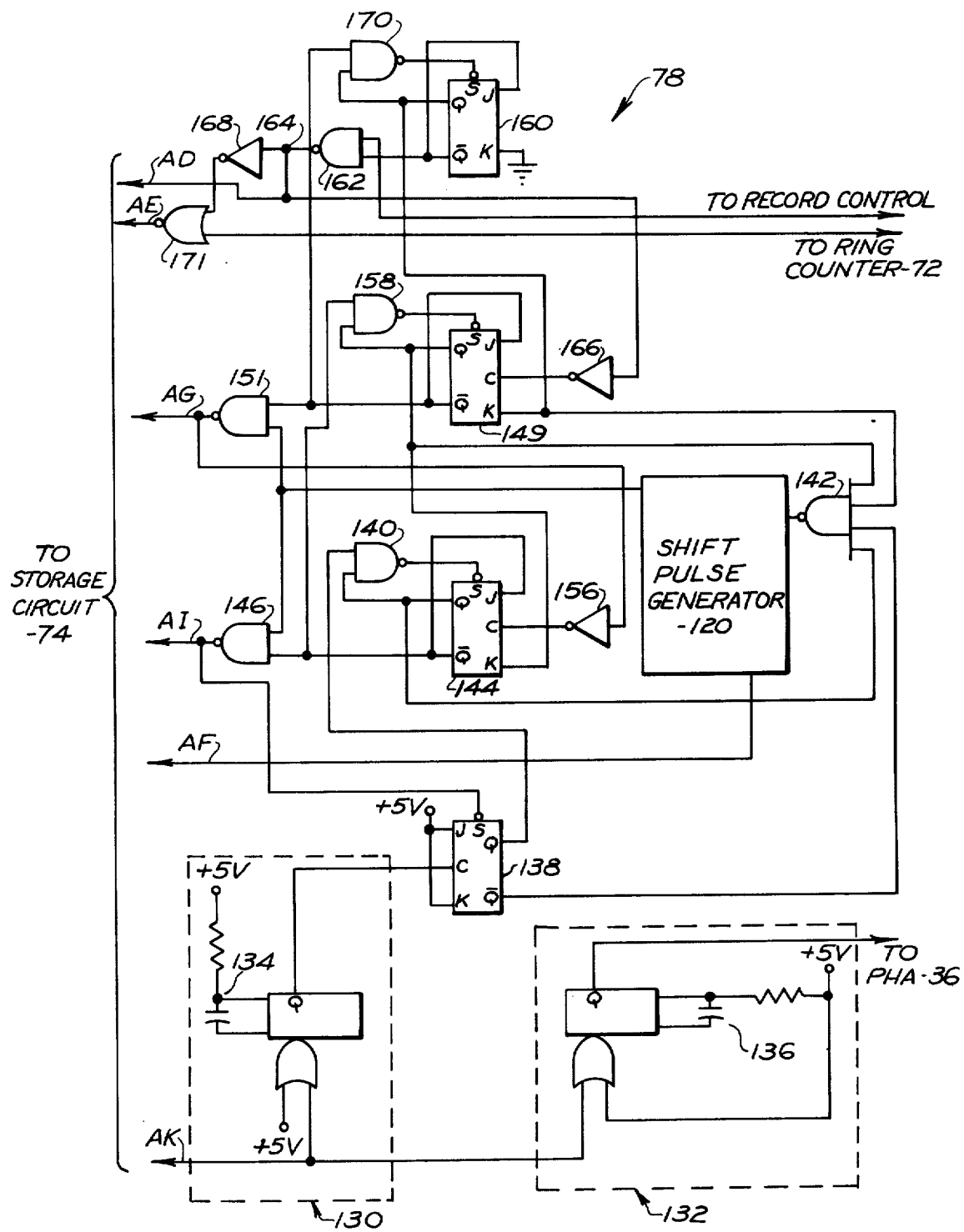

Reference is now made to FIGS. 2 and 3 which illustrate in detail the circuitry of the derandomizer circuit of the present invention. More particularly, the derandomizer circuit includes a storage stacking circuit 74, an imaging apparatus 76, and an inventory logic control circuit 74 for controlling the operation of the storage stacking circuit 74.

The stacking circuit 74 includes counter circuits and a number of buffer registers which each comprise a data storage unit. Each buffer register storage unit corresponds to a particular priority level associated with the data stored therein. The priority levels represented by the registers are arranged in ascending order from the bottom to the top of FIG. 2.

The storage stacking circuit 74 includes a "Y" channel storage section comprised of a pair of series-connected four-bit synchronous counters 80, 82 having there output terminals connected to the input terminals of an eight-bit bistable latching buffer register 84. The output terminals of the buffer register 84 are similarly connected to the input terminals of a second eight-bit bistable latching buffer register 86.

The output terminal of the second buffer register 86 are connected to the input terminals of a universal register 88 having its output terminals connected to the input terminals of an eight-bit bistable latching register 90 which serves as a digital-to-analog holding register. The output terminals of the bistable latching register 90 are connected to the input terminals of a Y channel digital-to-analog converter. This circuit preferably takes the form of a diode matrix for converting the pattern of input digital signals to analog signals. The analog signal developed by the Y channel digital-to-analog converter 92 is then applied to the Y terminal of an oscilloscope 94.

In a similar manner, the "X" channel storage section of the storage circuit 74 includes a pair of series-connected four-bit synchronous counters 96, 98 having their output terminals connected to the input terminals of an eight-bit bistable latching buffer register 100. The output terminals of the buffer register 100 are similarly connected to the input terminals of a second eight-bit bistable latching buffer register 102.

The output terminals of the second buffer register 102 are connected to the input terminals of a universal register 104 having its output terminals connected to the input terminals of an eight-bit bistable latching register 106 which serves as a digital-to-analog holding register. The output terminals of the bistable latching register 106 are connected to the input terminals of an X channel digital-to-analog converter 108. The digital-to-analog converter 108 similarly takes the form of a diode matrix for converting the pattern of output digital signals to analog signals. The analog signal developed by the X channel digital-to-analog converter 92 is then applied to the X terminal of an oscilloscope 94.

The counters and buffer register storage units of the stacking circuit are preferably integrated circuits. FIG. 2 shows the specific numerical designation of each of these elements, along with the pin numbers indicating the specific manner of their interconnection.

FIG. 2 also shows gating circuitry which converts the width-modulated pules from the converters 60X, 60Y to two trains of pulses. These trains of pulses each have a number of pulses which is a function of the values of the X and Y coordinates of the radiation stimulus in response to which it is generated. These two pulse trains are directed to the counters which digitize them for insertion into the storage unit registers.

The output conductor 62Y of the Y height-to-time converter 60Y is connected through an inverter 110 to the input terminals of the Y counters 80, 82. Similarly, the output conductor 62X of the X height-to-time converter 60X is connected through an inverter 112 to the input terminals of the X counters 96, 98.

As illustrated, one of the input terminals of the ring counter 72 is connected through an inverter 114 to one of the input terminals of a NOR gate 116 having its output terminal connected to the clocking terminals of the Y counters 80, 82 and X counters 96, 98. The other input terminal of the NOR gate 116 is connected to the output terminal of an inverter 118 having its input terminal connected to receive a reset signal. The output terminal of the inverter 118 is also connected through another inverter 121 to the reset terminals of the Y counters 80, 82 and the X counters 96, 98.

Thus, the Y counters 80, 82 count clocking pulses from the ring counter 72 for a period of time defined by the time interval of the signal developed by the Y height-to-time converter 60Y. Accordingly, the pattern of signals stored in the Y counters 80, 82 is a digital signal representative of the width of the signal developed by the Y height-to-time converter 60Y. The X counters 96, 98 operate in a similar manner to develop a pattern of signals representative of the width of the signal developed by the X height-to-time converter 60X. A reset signal is applied through the inverter 118 to the Y counters 80, 82 and the X counters 96, 98 to reset these counters upon the completion of a counting operation.

As will be explained below, the inventory control circuitry advances the data signals through the stacking circuitry to the registers 90, 106. These signals are then clocked by a transfer synchronization circuit to downstream imaging apparatus, in synchronism with the ability of the downstream circuitry to accept them.

FIG. 2 shows the output terminals of the digital-to-analog holding registers 90, 106 connected to the downstream circuitry comprising an imaging apparatus for processing the digital data signals appearing on the outputs of the registers 90, 106. This downstream circuitry includes an input interface 122, a computer 124 and an oscilloscope 128.

The input interface includes recording apparatus for recording and storing the data signals from the registers 90, 106 for later playback and processing.

Figure 4:
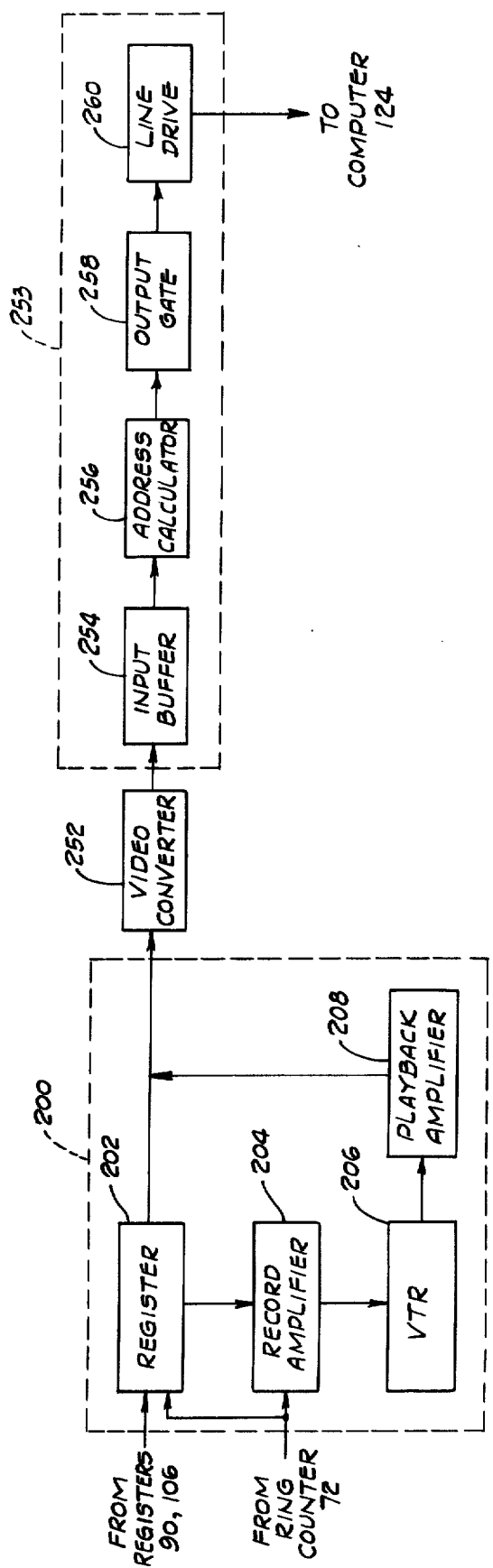
FIG. 4 is an electrical block diagram of the recorder and imaging apparatus of the scintillation imaging system.

The recording apparatus is illustrated in FIG. 4 in the box designated as 200. The recording apparatus 200 used in this preferred embodiment is explained in detail in U.S. patent application Ser. No. 287,623, to Ronald J. Martone et al, filed Sept. 11, 1972, for "SCINTILLATION CAMERA" which has been expressly incorporated by reference into both this application and its parent.

The recording apparatus 200 includes a register 202, a record amplifier 204, a video tape recorder 206 and a playback amplifier 208. As set forth in the above application Ser. No. 287,623, and explained below, the ring counter 72 actuates the registers 90, 106 to transmit their data to the register 202. The ring counter 72 also directs signals to the record amplifier 204, actuating the record amplifier to transfer the data from the register 202 to the recorder 206. A similar signal is directed by the ring counter to the register 202 enabling it to transfer its data to the recorder 206 through the record amplifier 204. Digitized signals representing both the X and Y parameters of the radiation stimuli, as well as the flag signal, are thus stored in the register 202 and are recorded by the recorder 206.

The playback amplifier 208 is connected to the recorder 206. The playback amplifier 208 is responsive to a command signal generated by command signal apparatus (not shown) at any convenient predetermined time to play back the signals recorded by the recorder 206 into the downstream imaging apparatus.

Thus, the recorded digital signals are directed to the remaining downstream circuitry of the imaging apparatus. This additional downstream circuitry processes the stored signals which are played back and generates an image corresponding to the information borne by these signals.

The register 202 accepts data from the registers 90, 106 in a parallel mode. However, it shifts this data out in a serial mode because the video tape recorder 206 is of a type which requires serial data input. This serial arrangement of data must be interspersed with other data bits in order to synchronize the video tape recorder to properly receive each data signal word. These added synchronization signals are added by the record control amplifier 204 as the shifted data signal word passes through it on its way to the video tape recorder. Thus, each signal recorded by the video tape recorder 206 includes a number of bits which represent the X and Y parameters of its corresponding radiation event, along with synchronization signals. Groups of such signal ensembles collectively carry video forwarded information representing an image of the radiation stimulus events represented by the signals.

The specific design of the record control amplifier 204 and the register 202, and their connection to the video tape recorder 206, are set forth in detail in the above expressly referenced application Ser. No. 287,623.

The synchronization signals produced by the record control amplifier 204 are synchronous with the operation of the video tape recorder. This is to insure that any data passed to the video tape recorder is recorded across the full width of the video tape. Hence, the recording apparatus 200, and particularly the video tape recorder and record control processing circuitry combination, has "time slots," during which it can accept data from the register 202, and hence from the registers 90, 106. When data appears in the register 202 from the registers 90, 106, it must remain there until the next time slot of the record control and recording circuitry begins.

The recording apparatus 200 can record data only in these predetermined time slots. The data from the radiation detector, however, occurs at intervals which are randomly spaced in time. The data is generated in response to the occurrence of radiation events, and hence there may be a burst of successive data inputs more closely spaced in time than the time slots. At other times, the occurrence of data may be more widely spaced in time than the time slots.

The stacking circuitry of this invention enables the storage of several data signals simultaneously. Inventory control circuitry, described in more detail below, presents the stored data to the recording apparatus on a first in, first out basis.

The inventory control circuitry in part does this by monitoring the storage unit operation to sense the presence or absence of data in the various counters and storage register units 84, 100, 86, 102, 88, 104, and 90, 106 which constitute the stacking circuitry. The inventory control circuitry advances data signals through the stacking circuitry from lower to higher priority storage units toward the recording apparatus 200 as rapidly as possible. The inventory control circuitry also prevents the insertion of data from a lower priority register to a higher priority register if the latter register already contains data. As soon as data is moved out of the higher priority register, each data signal present in lower priority registers is advanced by the inventory control circuitry to the next higher priority register storage unit.

The inventory control circuitry, in response to signals from the ring counter 72 moves data at regular intervals from the registers 90, 106 to the recording apparatus 200. This data is so moved in synchronism with the occurrence of the time slots during which the recording apparatus can accept data.

According to the foregoing, the stacking circuitry can accumulate for storage a plurality of data signal portions. If the data portions occur at a rate faster than that at which the recording apparatus can accept them, the stacking circuitry can store each of a plurality of data signal portions and the inventory control circuitry feeds each one to the recording apparatus 200 at regular intervals in synchronism with the occurrence of the time slots. Therefore, within limits, a plurality of data portions occurring too fast for the recorder apparatus 200 to accept can be stored and fed in synchronously with the time slots. In prior apparatus, such data signal portions occurring after the first are lost if they occur too fast for the recorder to accept them. This invention thus reduces the data loss which would otherwise take place.

The signals emerging from the recording apparatus constitute a set of digital bits representing each of the X and Y parameters of the location of the flash in response to which the data portion is generated. Each signal also includes synchronizing signals which are added to the X and Y bits by the record amplifier 204, to impart a video format to the signals ensemble.

These video formated signals can be employed in a variety of known ways to generate visual images representing the occurrence of the radiation stimuli events in response to which the video formated signals are generated.

In the present embodiment, this downstream imaging apparatus is shown in FIGS. 3 and 4. The imaging apparatus processes the video formated signals emanating from the recording apparatus 200 and generated a visual image therefrom. The visual image represents the actual radiation stimuli in response to which the video formated signals are generated. The imaging apparatus includes a video converter 252, a pre-processor generally designated at 253 (part of the input interface 122), a computer 124, a storage apparatus 264, an address decoder 266 and output circuitry.

The video converter 252 is connected to receive the video formated signals from the recording apparatus 200. The video converter converts the video formated signals into pure binary digital signals for acceptance by the computer. It does this by discriminating between the bits indicating the X and Y parameters of the radiation event, and the synchronizing signals. The synchronizing signals are stripped off and employed to indicate word endings among the bits of binary data representing the X and Y parameters. The video converter 252 thus provides binary digital data to the pre-processor 253 representing the occurrence of the radiation events. The circuitry of the video converter 252 is set forth in detail in U.S. Pat. No. 3,697,956, to Goldman et al (especially in Column 6, lines 5–54; Column 8, line 34; and column 13, line 19). This patent has already been expressly incorporated by reference herein, and in the application parent to this one.

The pre-processor 253 includes an input buffer 254, an address calculator 256, an output gate 258 and a line driver 260. The pre-processor 253 accepts digital binary data from the video converter 252 for producing a particular address signal identifying each binary digital word output from the video converter. The address is one which is recognizable by the computer and which actuates the computer to store the address signal in a particular channel unique to all signals having the same address. The pre-processor 253, after producing the address signal, directs the address signal to the computer for storage.

Accordingly, the data from the video converter 252 is accepted by the input buffer 254. The input buffer 254 presents this data to the address calculator circuit 256, which converts the signal to a particular address signal recognizable by the computer. The address calculator circuit 256 presents its output to the output gate 258, which in turn presents the data to the line driver 260. The line driver 250 inputs the data to the computer 124. The elements of the pre-processor 253, i.e., the input buffer 254, address calculator circuit 256, output gate 258 and line driver 260 are described in detail in the above referenced U.S. Pat. No. 3,697,956, particularly at Column 6, line 55 − Column 7, line 27; and Column 13, line 19 − Column 15, line 26.

The computer 124 accepts address data from the pre-processor 253. The computer inserts the address data into a storage element 264. The storage element 264 has a plurality of storage channels. Each storage channel is allocated for all signals having a particular address. The computer places each address signal it receives into that storage channel associated with the particular address of the signal.

In this preferred embodiment, the computer 124 is a PDP8/1 digital computer, manufactured by the Digital Equipment Corporation. The storage unit 164 is preferably a 4096 word peripheral memory, and is connected in known fashion to the computer 124. The computer 124 and the storage unit 264 are described, and their operation explained, in the above referenced U.S. Pat. No. 3,697,956 to Goldman et al.

The computer 124, on command, delivers the signals stored in the various address channels of the storage unit 264 to an address decoder 166. The address decoder produces digital signals representing the values of the numbers of signals stored in each of the address channels of the storage unit 264.

The address decoder delivers its output signals to the image producing oscilloscope 128 by way of the digital-to-analog converter 126. The oscilloscope then produces a visual image of the signals from the address decoder, which signals represent the magnitude of the number of radiation events taking place at the location corresponding to each address channel. The circuitry of the address decoder 266, and its connection with the oscilloscope 128, is also set forth in detail in the above referenced U.S. Pat. No. 3,679,956 to Goldman et al.

The particular form of the imaging apparatus including the video converter, pre-processor, computer and associated output circuitry, is not essential to the practice of this invention. Other known imaging apparatus may be connected to the recording apparatus 200 to produce the visual image of the radiation stimuli. The choice of the particular form of imaging apparatus is dependent upon individual requirements and costs.

Thus, the essential elements of this invention involve the use of stacking storage circuitry and inventory control circuitry to present each of the data signals from the detector to the recording apparatus in synchronism with the occurrence of the time slots during which the recording apparatus can accept the data. What is done with the data after its output from the recording apparatus is a matter of design choice and not essential to the present invention. The example given of the specific imaging apparatus is merely for the purpose of illustration.

Timing circuitry is provided to regulate the receipt of data by the counters. New data is prevented from being input to the counters before the counters can digitize data they already have. The timing circuitry includes the multivibrators 130, 132 and their associated elements, shown in FIG. 3.

TIMING CIRCUITS

The output terminal of inverter 110 is also connected to the pair of one-shot multivibrators 130, 132. The multivibrator 130 includes a resistive-capacitive timing circuit 134 for causing the multivibrator circuit to develop an output signal at 12 microseconds after the receipt of an input signal on the lead AK from the ring counter 72. The 12 microsecond period is sufficient to allow the digitization of the data signals by the counters. The output of the multivibrator 130 is used to initiate the monitoring of the storage unit operation, as described below.

The one-shot multivibrator 132 includes a resistive-capacitive timing circuit 136 for causing this multivibrator to develop an output signal at approximately 7 microseconds after the receipt of a signal from the ring counter 72 on the lead AK. The signal developed by the multivibrator 132 is applied to the pulse height analyzer circuit 36 to reset this circuit in order that the circuit may analyze the next data signal. In other words, the pulse height analyzer 36 is disabled for a period of time, i.e., approximately 5 microseconds, in order to provide sufficient time to digitize the signals and apply the signals to the storage circuit 74.

INVENTORY CONTROL

The inventory control circuitry includes advancement circuitry for moving data and signals through the stacking circuitry to successively higher priority levels. It also includes a transfer synchronization circuit for clocking data from the highest priority register units 90, 106 to the recording apparatus 200, in step with its time slots.

The advancement circuitry includes monitoring circuitry for sensing the operation of the register storage units to indicate the location of data therein, and clocking circuitry for moving data in lower priority registers to higher priority registers in response to the absence of data in the higher priority registers.

This inventory control circuitry is described as follows, with reference to FIG. 3.

ADVANCEMENT CIRCUITRY

The output terminal of the one-shot multivibrator 130 is connected to the "C" terminal of a J-K flip-flop 138 having its "J" and "K" terminals connected in common to a positive voltage supply source. The "Q" terminal of the J-K flip-flop 138 is connected to one of the input terminals of a NAND gate 140 and the "$\overline{Q}$" terminal of this flip-flop is connected directly to one of the inputs of a four-input NAND gate 142. The output terminal of the NAND gate 140 is connected to the "S" terminal of another J-K flip-flop 144 and the output terminal of the four-input terminal NAND gate 142 is connected to the enabling terminal of a shift pulse generator 120. The other input terminal of the NAND gate 140 is connected to the Q terminal of the J-K flip-flop 144 and the output terminal of this NAND gate is connected to the S of the flip-flop 144. The Q terminal of the J-K flip-flop 144 is also connected to a second input of the NAND gate 142 and the $\overline{Q}$ terminal of this flip-flop is connected back to the J terminal of the flip-flop. In addition, the $\overline{Q}$ terminal of the flip-flop 144 is connected to one of the input terminals of a NAND gate 146 having its output terminal connected through a pair of inverters 148, 150 to the shift terminals of the buffer registers 100, 84, respectively. The output terminal of the NAND gate 146 is also coupled back to the S terminal of the J-K flip-flop 138. The K terminal of the flip-flop 144 is connected in common to a third one of the input terminals of the NAND gate 142 and to the Q terminal of still another J-K flip-flop 149.

The $\overline{Q}$ terminal of the J-K flip-flop 149 is connected to the J terminal of this flip-flop and is also connected to one of the input terminals of a NAND gate 151. The other input terminal of the NAND gate 151 is connected in common with the other input terminal of the NAND gate 146 to the output terminal of the shift pulse generator 120. In addition, the output terminal of NAND gate 151 is connected through a pair of inverters 152, 154 to the buffer registers 102, 86, respectively. The output terminal of NAND gate 151 is also coupled through an inverter 156 to the C terminal of the J-K flip-flop 144.

One of the input terminals of a NAND gate 158 is connected to the $\overline{Q}$ terminal of the J-K flip-flop 144 and the other input terminal of this NAND gate is connected to the Q terminal of the J-K flip-flop 149. The output terminal of NAND gate 158 is connected directly to the S terminal of the flip-flop 149.

As illustrated, the K terminal of the J-K flip-flop 149 is connected to the fourth input terminal of the NAND gate 142 and is also connected to the Q terminal of another J-K flip-flop 160. The $\overline{Q}$ terminal of the flip-flop 160 is connected directly to the J terminal of this flip-flop and is connected through a NAND gate 162 to a juncture point 164. The juncture point 164 is in turn connected through an inverter 166 to the C terminal of the J-K flip-flop 149 and is also connected through an inverter 168 to one of the input terminals of a NOR gate 171. The other input terminal of NOR gate 171 is connected directly to the ring counter 72 and the output terminal of this NOR gate is connected to the clock terminals of universal registers 88, 104. The juncture point 164 is also connected to the clock terminals of the universal registers 88, 104.

The K terminal of the J-K flip-flop 160 is connected directly to ground, the J terminal of this flip-flop is connected directly to the $\overline{Q}$ terminal of the flip-flop, and the Q terminal is connected to one of the inputs of a NAND gate 170 having its output terminal connected directly to the S terminal of the flip-flop 160. The other input terminal of the NAND gate 170 is connected back to the $\overline{Q}$ terminal of the J-K flip-flop 149.

As described above, the Y counters 80, and 82 and the X counters 96, 98 convert the signals developed by the Y and X height-to-time converters 60Y, 60X to digital data signals representative of the width of the signal developed by the converters 60Y, 60X. These digital signals are then stored in the counters and are applied to the input terminals of the corresponding buffer registers 84, 100.

The inventory logic control circuit 78 monitors the operation of the buffer registers 86, 102 and immediately after the transfer of stored data from these buffer registers to the universal registers 88, 104, respectively, the buffer registers 84, 100 are commanded to shift the data stored in these registers to the registers 86, 102. Then, a command signal is applied to the buffer registers 84, 100 to allow data signals in the counters 80, 82, 96, 98 to be stored in these buffer registers. Thus, the inventory logic control circuit 78 serves to transfer the data signals as far as possible in the chain of registers.

More particularly, the signals which are applied by the height-to-time converter 60Y, 60X take the form of pulse width modulated signals, i.e., the width of these signals is proportional to the coordinate values of a scintillation event. The ring counter 72 applies a clocking signal through the inverter 114 and NOR gate 116 to the counters 80, 82, 96, 98 so that the number of counted pulses is directly proportional to the width of the signals developed by the converters 60Y, 60X. Accordingly, a digitized Y coordinate data signal appears at the output of the Y counters 80, 82 and a digitized X signal appears at the outputs of the X counters 96, 98.

At the time the counters begin digitizing the width modulated signals, a signal is applied to the one-shot multivibrator 132 which, after a time delay of approximately 7 microseconds, resets the pulse height analyzer 36 for analyzing the next data signals. Thus, the next data signals are not applied to the counters 80, 82, 96, 98 until the counters have had sufficient time to digitize the previously received data signals.

Upon receipt of succeeding data signals from the converters 60Y, 60X, the counters 80, 82, 96, 98 are reset and again commence counting for a period of time equal to the pulse width of the received data signals. This time period is established by the timing circuit comprising the multivibrator 130.

The presence of data signals in the counters 80, 82, 96, 98 is indicated by the state of the J-K flip-flop 138. As described above, the one-shot multivibrator 130 develops an output signal after a period of time sufficient to complete the digitizing of the pulse width modulating signals. The output signal developed by the multivibrator 130 is applied to the C terminal of the flip-flop 138 thereby causing the signal applied to the Q terminal of this flip-flop to change from a "low" signal to a "high" signal. This high signal is then applied to the NAND gate 140 thereby causing the output of this NAND gate to change from a high signal to a low signal, assuming a high signal is applied to the Q terminal of the flip-flop 144. A high signal will be applied to the Q terminal of flip-flop 144 if there are data signals presently stored in the buffer registers 84, 100.

The low signal applied to the S terminal of the flip-flop 144 by the NAND gate 140 causes the J terminal of this flip-flop to change from a low signal to a high signal thereby causing a high signal to be applied to the NAND gate 146. When the high signal is applied to one of the input terminals of the NAND gate 146 it allows clocking signals from the shift pulse generator 120 to pass through the gate 146.

The clocking signals which pass through the NAND gate 146 take the form of low signals. These signals are inverted by the inverters 148, 150 thereby causing the digital data signals which appear on the output terminals of the counters 80, 82, 96, 98 to be "clocked" onto the output terminals of the buffer registers 84, 100.

The shift pulse generator 120 is controlled by the four-input NAND gate 142 so that clocking signals are generated by this pulse generator only if a low signal is applied to one of the inputs of the NAND gate 142. All of the signals applied to the NAND gate 142 take the form of high signals if all of the registers contain stored data signals. When one of the registers shifts its data signals to a subsequent register, a low signal is applied to a corresponding one of the input terminals of the NAND gate 142 to thereby allow the pulse generator to commence generating clocking pulses.

Once the data signals have been stored in the buffer registers 84, 100, these signals remain in these registers until data stored in the buffer registers 86, 102 has been transferred to the universal registers 88, 104. If the registers 86, 102 have previously shifted the data signals stored in these registers to the universal registers 88, 104, the signal appearing on the Q terminal of flip-flop 149 will take the form of a high signal. This high signal is applied to one of the input terminals of the NAND gate 158. The other terminal of the NAND gate 158 receives a high signal from the $\overline{Q}$ terminal of flip-flop 144 as described previously. Thus, the output terminal of NAND gate 158 takes the form of a low signal which when applied to the S terminal of the flip-flop 149, causes the signal appearing on the $\overline{Q}$ terminal of this flip-flop to change from a low to a high signal. The high signal which appears on the $\overline{Q}$ terminal of flip-flop 149 is then applied to one of the input terminals of the NAND gate 151 thereby opening this gate to the passage of clocking pulses from the shift pulse generator 120 in a manner similar to the operation of NAND gate 146. When these clocking pulses are applied to the inverters 152, 154, the buffer registers 86, 102 are clocked so that the stored data may be transferred to the output terminals of these registers.

TRANSFER SYNCHRONIZATION CIRCUIT

When a high signal is applied to the NAND gate 151, that signal is also applied to one of the input terminals of the NAND gate 170. If there are no data signals stored in the universal registers 88, 104, the signal developed on the Q terminal of flip-flop 160 takes the form of a high signal. Thus, with high signals applied to both the input terminals of NAND gate 170, a low signal is applied to the S terminal of flip-flop 160 thereby causing the flip-flop 160 to be actuated resulting in the signal applied to the $\overline{Q}$ terminal of this flip-flop changing from a low to a high signal. The high signal developed by the $\overline{Q}$ terminal of flip-flop 160 is applied to one of the input terminals of the NAND gate 162. The other input terminal of the NAND gate 162 is adapted to receive a record control signal. The record control signal is synchronized with the video tape recorder so that the signal developed by the NAND gate 162 is so synchronized. The signal developed by the NAND gate 162, i.e., a low signal, is applied through the inverter 168 thereby causing a high signal to be applied to the NOR gate 171. With a high signal applied to the input terminal of the NOR gate 171, the output signal of the NOR gate 171 causes signals to be applied to the clocking terminals of the universal registers therby causing data signals to be serially shifted out of the universal registers 88, 104. The clocking signal is applied to the universal registers 88, 104 by the ring counter 72. The data signals are then stored in the digital-to-analog holding registers 90, 106 and are either applied through the digital-to-analog converters 92, 108 to an oscilloscope or are held ready for application to the recording apparatus 200, as described above. The data in the registers 90, 106 is applied to the recording apparatus by clock signals from the ring counter applied to the registers through the inverter 109.

Although the invention has been shown with four storage registers, additional storage devices may be added to expand the storage capacities of the system and permit derandomization of data signals having an even higher rate of occurrence.

The invention has been shown in connection with a preferred embodiment, but it will be readily apparent to those skilled in the art that various changes in form and arrangement of parts may be made to suit requirements without departing from the spirit and scope of the invention as defined by the appended claims.

What is claimed is:

1. A data derandomizer circuit for a radiation scintillation imaging system, the system including detector circuitry for producing data signals each representing the location of a single randomly occurring radiation stimulus event emanating from a subject, each data signal produced substantially contemporaneously with the radiation stimulus event which it represents, said system also including an imaging apparatus responsive to the data signals for producing an image of the stimuli events represented by the data signals and a continuously operable processing apparatus connected between the detector circuitry and the imaging apparatus for processing said data signals for receipt by said imaging apparatus, said processing apparatus being able to accept an individual data signal only during one of a plurality of predetermined substantially equal and adjacent time slots, said data derandomizer being connected between said detector circuitry and said processing apparatus, said data derandomizer comprising:
   a. a stacking circuit having a plurality of storage units for each unit being capable of receiving and storing only one of said plurality of said data signals, each storage unit corresponding to one of a sequence of different higher and lower priority levels ordered in accordance with the time order of occurrence of said data signals,
   b. means for inserting said data signals as they occur into the lowest priority level storage unit, and
   c. inventory control circuitry connected between said stacking circuit and said processing apparatus and comprising:
      i. a circuit for advancing each data signal stored in a storage unit and representing a single radiation stimulus event to the next higher priority level storage unit whenever said next higher priority level storage unit is not occupied by another data signal, and
      ii. a transfer synchronization circuit for transmitting a data signal present in the highest priority of the storage units to said processing apparatus in synchronism with the occurrance of the first of said time slots to occur after the appearance of said data signal in said highest priority level storage unit
   whereby a plurality of said data signals each representing a single radiation stimulus event and having a time spacing less than the duration of a time slot can be stored and subsequently individually presented to the processing apparatus as rapidly as possible consistant with synchronism with the occurrence of the time slots to reduce loss of data signals which would otherwise occur because of the inability of the processing apparatus to accept all such data signals as rapidly as they occur.

2. The data derandomizer circuit of claim 1, wherein said processing apparatus comprises:

a. a continuously operable video tape recorder connected to receive and record said data signals from said highest priority level storage unit and b. apparatus for playing back the data signals recorded by said video tape recorder and directing said played back data signals to said imaging apparatus.

3. The data derandomizer circuit of claim 1, wherein said data signals each comprise a plurality of bits, and wherein said storage units of said stacking circuitry together comprise:

a plurality of pair of registers connected in cascade each pair comprising one of said storage units and accommodating the bits of a said data signal representing a single radiation stimulus event.

4. The data derandomizer circuit of claim 3 wherein said advancing circuit comprises:

a. sensing circuitry for monitoring the operation of said storage units to indicate whether data is present in at least two of said registers representing adjacent levels of priority, and b. clocking circuitry connected to said sensing circuitry and said stacking circuit and being responsive to the absense of data in the one of said two registers representing the higher priority level to clock the data in the lower priority register into said higher priority register.

5. The data derandomizer circuit of claim 4, wherein said clocking circuitry comprises:

a. a shift pulse generator for producing a high frequency toggling signal to said registers, and b. logic gating circuitry connected between said shift pulse generator and said sensing circuitry for controlling the transmission of said toggling signal to said registers to effect said clocking in accordance with the data presense sensed by said sensing circuitry.

6. The data derandomizer circuit of claim 5 wherein said transfer synchronization circuit comprises:

a ring counter connected between said highest priority register and said processing apparatus for producing a clocking signal to the highest priority level storage unit of the stacking circuit synchronously with the occurrence of a time slot of said processing apparatus.

7. The data derandomizer circuit of claim 3, said detector circuitry comprising:

a. a circuit for producing first and second pulses each having a length representing the value of the X and Y coordinates, respectively, of a radiation stimulus, and b. circuitry for converting the first and second pulses to first and second pulse trains each having a number of pulses representing said X and Y coordinates, respectively.

8. The derandomizer circuit of claim 7, wherein said radiation scintillation imaging system further comprises:

counter circuits including scalers connected to said detector circuitry for counting the number of pulses in said first and second pulse trains, and producing said data signals in digital form representing said X and Y coordinates in response to the counting of said counters and transmitting said digital data signals to said stacking circuit.

9. The data derandomizer circuit of claim 8, further comprising:

a timer circuit connected to said counters and responsive to the beginning of a counting operation to prevent the presentation of any additional pulse trains to said counters for a predetermined time thereafter, whereby said counter circuits are permitted to finish digitization of one pair of incident pulse trains before being required to count additional pulse trains.

10. The data derandomizer circuit of claim 1, wherein said data signal in said highest priority level storage unit is in digital form, said radiation scintillation imaging system further comprises:

a. digital to analog conversion apparatus connected to receive each said data signal in said highest priority level storage unit, and b. a display device connected to said digital to analog conversion apparatus for producing a visual image representing the radiation stimulus in response to which said data signal in said highest priority storage unit is generated.

11. The data derandomizer circuit of claim 1, wherein said data signal advancing circuit comprises:

circuitry for advancing each data signal in the stacking circuit to the storage unit corresponding to the next higher priority level when said next higher priority level storage unit is not occupied by another data signal.

12. A method for data synchronization for use in a radiation scintillation imaging system, the system including detector circuitry for producing data signals each representing a single randomly occurring radiation stimulus event emanating from a subject each data signal being produced substantially contemporaneously with the occurrence of the radiation event which it represents, an imaging apparatus responsive to the data signals for producing an image of the stimuli thereby represented, and a continuously operable processing apparatus connected between the detector circuitry and the imaging apparatus for processing said data signals for receipt by said imaging apparatus, said processing apparatus being able to process an individual data signal only during one of a plurality of predetermined adjacent time slots of substantially equal magnitude, said method comprising the steps of:

a. storing each of a plurality of data signals in a storage means, the storage means including a stacking circuit having a plurality of storage units each unit being capable of receiving and storing only one of said plurality of data signals, each storage unit corresponding to one of a sequence of different higher and lower priority levels ordered in accordance with the time occurrence of said data signals, b. advancing each stored data signal individually to the next higher priority level storage unit substantially as soon as said next higher priority level storage unit is unoccupied by another data signal, c. transmitting the data signal in the highest priority level storage unit to said processing apparatus in synchronism with the first of said time slots to occur after the arrival of said data signal in said highest priority level storage unit.

13. The method of claim 12, wherein:

said processing apparatus operates to record and play back said data signals to said imaging apparatus.

14. The method of claim 12, wherein said detector produces a plurality of pairs of first and second width modulated pulses each having a length representing the value of the X and Y coordinates, respectively, of a radiation stimulus, said method further comprising the steps of:
a. converting each of the first and second pulses to first and second pulse trains, respectively, each pulse train having a number of pulses representing said X and Y coordinates, respectively;
b. counting the numbers of pulses in each of said first and second pulse trains;
c. producing digital data signals representing said X and Y coordinates in response to said counts, and
d. transmitting said digital signals to said storage means.

15. The method of claim 14, further comprising the step of:
preventing the generation of any additional pulse trains for a predetermined time after the beginning of each said counting step.

16. The method of claim 15, further comprising the steps of:
a. converting said digital data signals to analog form, and,
b. producing a visual image from said converted digital signals representing the radiation stimuli in response to which said digital signals are produced.

17. A radiation scintillation imaging system comprising:
a. a detector circuit for serially producing data signals each representing the location of a radiation stimulus emanating from a subject at a random time interval with respect to other stimuli;
b. an imaging apparatus responsive to the data signals for producing an image of the stimuli thereby represented;
c. a continuously operable processing apparatus connected between the detector circuitry and the imaging apparatus for processing said data signals for receipt by said imaging system, said processing apparatus being able to accept data signals only during each of a plurality of predetermined time slots;
d. a data derandomizer connected between said detector circuitry and said processing apparatus and comprising:
  i. a stacking circuit having a plurality of storage units for receiving and simultaneously storing each of a plurality of said data signals in a separate storage unit corresponding to one of a sequence of higher and lower priority levels in accordance with the order of occurrence of said data signals, and
  ii. inventory control circuitry connected between said stacking circuit and said processing apparatus comprising:
    1. a circuit for advancing each stored data signal individually to the next higher priority storage unit whenever said next higher priority level storage unit is not storing another data signal, and
    2. a transfer synchronization circuit for transmitting a succession of data signals stored in the highest priority storage unit to said processing apparatus in synchronism with the occurrence of said time slots, whereby a plurality of said data signals having a time spacing less than that of the time slots are stored and subsequently individually presented to the processing apparatus in synchronism with the occurrence of the time slots to reduce loss of data signals which would otherwise occur because of the inability of the processing apparatus to accept all such data signals at once.

18. A method for producing a visual display representative of randomly occurring spatial radiation stimuli emanating from a subject under examination by use of a display apparatus having a predetermined acceptance rate for signals representing the stimuli, said method comprising the steps of:
a. generating signals in response to the occurrence of said radiation stimuli, each of said signals bearing information describing the stimulus in response to which it is generated;
b. storing said signals in a plurality of storage units connected in cascade;
c. moving each of said signals from a previous storage unit to its next subsequent storage unit when said next subsequent storage unit is emptied of a stored signal; and,
d. transferring the stored signals from the last of said cascaded storage units at a rate compatible with the acceptance rate of the display apparatus so that a plurality of said stored signals which are generated at a rate greater than said acceptance rate are nonetheless applied to said display apparatus at said acceptance rate.

19. The method of claim 18, further comprising the step of:
digitizing said signals before storage thereof.

20. The method of claim 19, further comprising the step of:
converting the generated signals into signals each having a pulse width which is a function of a coordinate value of a radiation stimulus before digitizing said signals.

21. A scintillation imaging system for providing a display representative of randomly occurring spatial radiation stimuli emanating from a subject under examination, said system comprising:
a. a detector for receiving stimuli emanating from the subject and generating a signal in response to the occurrence of each radiation stimulus;
b. a display apparatus responsive to said signals to produce a visual display of the stimuli in response to which said signals are generated, said display apparatus having a predetermined acceptance rate for said signals;
c. a plurality of storage units connected in cascade for receiving and storing said signals from said detector in an order corresponding to that of their generation;
d. inventory logic circuitry connected to said storage units to actuate each storage unit to transfer the signal stored therein to the next successive storage unit when said next successive storage unit does not contain a signal, and
e. a synchronous transfer circuit for transmitting a succession of stored signals from one of said storage units to said display apparatus in synchronism with the acceptance rate of the display apparatus, whereby a plurality of stored signals occurring at greater than said acceptance rate are nonetheless applied to said display apparatus at said acceptance rate.

* * * * *